United States Patent
Rock

(10) Patent No.: US 11,895,187 B2
(45) Date of Patent: Feb. 6, 2024

(54) METHOD AND SYSTEM FOR DATA TRANSMISSION WITH SIGNIFICANTLY REDUCED LATENCY LOSSES

(71) Applicant: Klaus Rock, Aalen (DE)

(72) Inventor: Klaus Rock, Aalen (DE)

(73) Assignee: ISS IP HOLDINGS LLC, c/o HARVARD BUSINESS SERVICES, INC., Lewes, DE (US)

( * ) Notice: Subject to any disclaimer, the term of this patent is extended or adjusted under 35 U.S.C. 154(b) by 0 days.

(21) Appl. No.: 17/685,808

(22) Filed: Mar. 3, 2022

(65) Prior Publication Data
US 2022/0191278 A1 Jun. 16, 2022

Related U.S. Application Data

(63) Continuation of application No. PCT/EP2020/071554, filed on Jul. 30, 2020.

(51) Int. Cl.
*H04L 67/1097* (2022.01)
*H04L 65/612* (2022.01)
*H04L 67/568* (2022.01)

(52) U.S. Cl.
CPC ........ *H04L 67/1097* (2013.01); *H04L 65/612* (2022.05); *H04L 67/568* (2022.05)

(58) Field of Classification Search
CPC ..... H04L 67/56; H04L 67/564; H04L 67/567; H04L 67/569; H04L 67/60–63; H04L 67/1097; H04L 65/612
See application file for complete search history.

(56) References Cited

U.S. PATENT DOCUMENTS

| | | | |
|---|---|---|---|
| 5,826,031 A | * | 10/1998 | Nielsen ................. G06F 16/986 707/E17.118 |
| 7,793,342 B1 | | 9/2010 | Ehrahimi |
| 8,910,255 B2 | | 12/2014 | Nice |
| 9,282,145 B2 | | 3/2016 | Wei et al. |

(Continued)

FOREIGN PATENT DOCUMENTS

| | | |
|---|---|---|
| DE | 102017108168 A1 | 10/2018 |
| WO | 2015041711 A1 | 3/2015 |

OTHER PUBLICATIONS

Wen Tang, "A Web Page Loading Method and Device" Aug. 26, 2015, CN 104866499 A (English Translation), pp. 1-30 (Year: 2015).*

*Primary Examiner* — Jonathan A Bui

(74) *Attorney, Agent, or Firm* — Quarles & Brady LLP; Yakov S. Sidorin

(57) ABSTRACT

Data transmission delays can be significantly reduced by a method comprising by a client computer, receiving a command for downloading distributed information being identified by a primary location on a server sending information about the primary location to a proxy server, and retrieving at a primary piece of information of the distributed information being wherein the primary piece of information includes instructions for obtaining secondary pieces of information each being identified by secondary locations and determining a sequence of importance of the secondary pieces of information. The proxy server as well determines the sequence of importance and sends a first data stream comprising at least a portion of the secondary pieces of information to the client computer according to the sequence.

17 Claims, 3 Drawing Sheets

(56) References Cited

U.S. PATENT DOCUMENTS

| | | | |
|---|---|---|---|
| 9,307,004 B1* | 4/2016 | Hayden | H04L 67/01 |
| 2005/0240940 A1* | 10/2005 | Quinet | H04L 67/62 |
| | | | 719/315 |
| 2011/0082924 A1 | 4/2011 | Kopalakrishnan | |
| 2012/0209942 A1 | 8/2012 | Zehavi | |
| 2018/0067909 A1 | 3/2018 | Wei et al. | |
| 2021/0021691 A1* | 1/2021 | Galloni | H04L 67/34 |

* cited by examiner

METHOD AND SYSTEM FOR DATA TRANSMISSION WITH SIGNIFICANTLY REDUCED LATENCY LOSSES

CROSS-REFERENCE TO RELATED APPLICATIONS

This application is a continuation of pending International Application No. PCT/EP2020/071554 filed on Jul. 30, 2020 and now published as WO 2021/019035, which designates the U.S. and claims priority from European Application No. 19189655.4 filed on 1 Aug. 2019. The disclosure of each of the above-identified patent applications is incorporated herein by reference.

FIELD OF THE INVENTION

The invention relates to a method and a system for data transmission from a server to a client computer (hereinafter 'client') via the Internet.

DESCRIPTION OF THE RELATED ART

The Internet became one of the most relevant sources of information. The information is typically provided in the form of so-called websites. These websites are selected to be displayed by a user, e.g. by entering the corresponding URL into so called web browser. A web browser (commonly referred to as a 'browser') is a software application for accessing and displaying information on the Internet. The information to be displayed is provided by servers, mostly in the form of electronic hypertext files, typically encoded in HTML (Hypertext Markup Language). Presently, web browsers as well support other Document Standards from the World Wide Web Consortium like CSS, XHTML, RDF, OWL, CSS, SVG WCAG, JavaScript programming language files, codec files for multimedia applications and other. In any case, the web browser retrieves the information from servers and provides it via some user interface to the user, e.g. by displaying it on a screen. Audio and/or video streaming data can be provided as well by controlling the corresponding hardware (loudspeaker, graphic Card). Other forms of making the information accessible to the user can be used as well, for example a refreshable braille display may be used.

Once a user selects a website for being displayed, the client is controlled by the browser to load the primary data (as well referred to as primary information), for example a HTML file via the internet from the respective (primary) server. In most cases, the user enters a URL and the browser displays the information being provided by downloading the specified HTML file from the primary location corresponding to this URL. As usual, a URL is a reference to a web resource (for example the file) that specifies a location of the web resource on a computer network. The commonly accepted standard for URLs is defined in RFC 1738 (see tools.ietf.org/html/rfc1738), but other standards may be used as well. Most operating systems have standards for defining a location even on different computers using a path. Well known examples are defined by POSIX (e.g. "hostname:/directorypath/resource") or Microsoft Window's UNC, short for Universal Naming Convention ("\\Host-Name[@SSL][@Port]\SharedFolder\Resource"). Additional examples are provided at en.wikipedia.org/wiki/Path_(computing) (retrieved on Jul. 20, 2020).

In many cases, the primary information on the primary server comprises links to secondary information (e.g. links to secondary URLs or to another identifier of the secondary information) that need to be loaded from another location, in this case thus from a secondary location. The secondary location is the position where the client can find the secondary information (assuming there is no proxy server involved). The other (i.e. secondary) location is (strictly references) typically (to) a different file on the same or another server. The secondary location is mostly identified by a link or dynamically generated by a code script, again mostly in the form of an URL. This secondary information may further comprise one or more links to tertiary information that needs to be loaded from yet another location (tertiary location). Generally, this may continue until an $n_{max}^{th}$ information is loaded ($n_{max}$ being an integer greater 1). In short, there may be a sequence of $n_{max}$ levels of downloads to be executed by the client to gather all information required to assemble the entire required information, e.g. for executing a computer program and/or rendering and/or displaying an entire initially selected website. Each of the n-levels ($1 \le n \le n_{max}$, n is an integer) may require one or more downloads. As apparent, each single download is considered as accessing a single file from a location. Thus, the information being required is fragmented into pieces. These pieces are distributed across several locations. This kind of information is thus referred herein to a distributed information.

Only to avoid confusion, herein the term location be it a first location, a second location or a lower level location is the information where a piece of information can at least in principle be obtained from (downloaded). A location may comprise an identifier of the filesystem (i.e. the computer, typically in the form of an IP-address and/or any other address for identifying a computing device). Further, the location may comprise (in addition or alternatively) information about the place of the data on the computer. This place can be identified e.g. by a local path of a file on the host of the file system, as well as by a port or any similar means. Briefly summarizing a location provides host information, for example a host IP and the local path or any other identifier of the piece of information (e.g. an ID, enabling to retrieve the information in a database system on said host). One possibility to identify a location is an URL, but other formats, e.g. as defined by POSIX standards can be used as well. A knowledge of a location thus provides the possibility to find a file being stored in a computer network at the respective location. Assuming the client is authorized to access the file knowledge of the location enables the access.

Completely loading a distributed information from distributed locations and thus mostly distributed servers is time consuming. One reason is that the latency times for every request for information from the client to one of the servers sum up. This becomes problematic if the distances between the client and the servers providing the information are long, as the transmission delay becomes significant e.g. for satellite and/or mobile connections and other long-distance connections.

Displaying an entire website is thus delayed by accessing lower level information, e.g. the secondary (n=2) and tertiary (n=3) or quaternary information (n=4). The user must wait until the downloads are completed and the bandwidth of the network connection is not efficiently used as contacting another server to obtain the information specified by the respective lower level URLs causes latency times.

To reduce these problems present web-browsers have a subroutine that calculates a sequence for accessing the different locations. This subroutine typically has an algorithm that assigns to each piece of identified lower level information a value of importance and is referred to as sequencing subroutine. Subsequently, the information is loaded and displayed according to the respective values of importance: First, the highly important information and subsequently the less important information is loaded and displayed. The sequencing subroutine thus determines a sequence of importance of the identified lower level pieces of information.

For example, the sequencing subroutine may assign a high value of importance to the information that is to be displayed in a frame of a website that is in the presently selected field of view (above the fold) and a lower level of importance to information that will become visible only if a user scrolls to another portion of the website (below the fold) (i.e. if the user changes the field of view). Other aspects for assigning importance include commercial aspects, for example sequencing advertisements prior to other content. Another aspect for sequencing may be observed or expected user behavior. Hereinafter, we will refer to these subroutines as a "sequencing routine", because they define the sequence in which pieces of information are loaded by the client and optionally made available to the user. But sequencing subroutines do not reduce the over-all latency time which is the cumulated latency time for downloading the entire distributed information being defined by a source of primary information. However, a sequencing subroutine reduces the time a user has to wait until the most required pieces of information are made available. What information the "most required" is, depends on the intention of the provider of sequencing subroutine, as indicated above.

A possibility to reduce the latency times and to use bandwidth more efficiently is to provide a forward proxy sever that mirrors information. Typically, a forward proxy server caches often searched information and provides it to clients in its geographic vicinity, thereby reducing latency times and freeing bandwidth of long-distance connections.

As usual, herein a proxy server is a server application or appliance that acts as an intermediary for requests from clients seeking resources from servers that provide those resources. A proxy server thus functions on behalf of the client when requesting service, potentially masking the true origin of the request to the resource server. Instead of connecting directly to a server that can fulfill a requested resource, such as a file or web page for example, the client directs the request to the proxy server, which evaluates the request and performs the required network transactions. (source: en.wikipedia.org/wiki/Proxy_server, retrieved on Jul. 23, 2020). A forward proxy is an internet facing proxy server that caches data from a wide range of sources. Forward proxies have been suggested in a number of patents and applications, e.g. U.S. Pat. No. 7,793,342 B1, US20120209942A1, U.S. Pat. No. 8,910,255 B2 to name only a very limited number. Proxy servers are often briefly referred to as 'proxy'.

U.S. Pat. No. 9,282,145 B2 suggests an intermediary between a browser executing client and a webserver providing the information to be displayed on the client using the browser. Intermediate injects or incorporates code fragments as these fragments are loaded by the browser being executed on the client. The injected code is configured to perform actions that modify the web page or affect some aspect of a resource of the web page to improve user experience. For example, the code may, upon execution, pre-fetch a resource for faster loading at a right moment, provide cookie management for enhanced web-based interactions, incorporate third-party resources to a web page, or alter the characteristics of resources. In certain embodiments, the code injected and delivered via a first fragment may control how subsequent fragments are incorporated or assembled with the first fragment. The code identifies unique identifiers or markers in the first fragment for additional fragments, and selectively generates HTML requests to retrieve particular fragments. The code controls loading and integration of web object fragments at the client, by changing a rendering priority or characteristic of one or more fragments. A requested web page is modified dynamically at the intermediary and assembled at the client without affecting how the server generates its web pages.

A similar attempt is suggested in US20180067909A1, again an intermediary manages delivery of content to a client by incorporation of code into a webpage to affect a loading priority or sequence of certain web object fragments on the browser. Instead of rendering all fragments, only certain fragments are delivered and rendered as needed, leading to bandwidth and processing efficiencies.

The teaching of US 2011/0082924 A aims for reducing the transmitted volume of streaming data like e.g. video data, in a communication network. Based on the observation that the volume of streaming data increases with increasing encoding bit rate means are suggested to reduce the encoding bit rate. For example, in an embodiment the bit rate at which a video data stream is sent is artificially reduced, to thereby motivate the receiving client to reduce the requested resolution of the video encoding. Further, it is suggested to intercept an HTTP manifest file being sent from a server to the client by an intermediate and to edit the manifest file by the intermediate to delete URI's that identify video streams having a high encoding bit rate. As a result, the option of requesting a higher encoding bit rate is not available to the client.

With the increasing use of point to point encryption in any web-based communication content alteration by traffic intercepting intermediates becomes extremely difficult as it requires enormous computational effort to break commonly used encryption methods, the most prominent being the RSA-algorithm. Further, traffic interception and in particular alteration is prohibited in most countries and in some punished as crime.

SUMMARY OF THE INVENTION

The invention is based on the observation that sequentially loading lower level information, i.e. secondary, tertiary and so forth information causes relevant latency times when displaying a website and causes secondary traffic on the respective data lines, wherein secondary traffic denotes any traffic that does not transport the required information, but instead is necessary to establish and maintain the connection (handshake sequences, keep alive messages, encryption key exchanges, etc.).

The invention addresses the problem of reducing the time for making downloadable distributed information available. Solutions of the problem are described in the independent claims. The dependent claims relate to further improvements of the invention. Embodiments of the invention include a method for exchanging data between a client and a proxy-server, a computer readable medium comprising instructions for performing the method steps to be performed by the client and/or the proxy server, as well a computing device being configured to execute the method steps to be executed by the client or by the proxy server of by both.

The method according to the invention has a number of steps and provides for a reduction in latency times when accessing distributed information, e.g. a webpage or other information on the internet by a client computer via a proxy server (hereinafter as well briefly 'proxy').

Initially, a client computer receives a request to download distributed information. The request being received may comprise a primary location on a server, wherein the primary location identifies the distributed information. Instead of using the term location on a server (or on a client, or on a computer system, . . . ), one may as well use the term path on the server (client, computer system, respectively) as a path is generally defined as to specify a unique location in a file system, wherein the file system is the server's, client's or computer system's file system, respectively. The term "location" of a piece of information without referencing to a particular computer system (server, client, . . . ) hence implies that the location information comprises an identification of the computer system on which the piece of information can be found and the corresponding path. This can be generalized as well for pieces of information that are not stored in a directory tree hierarchy. The term a location of a piece of information identifies the information where a piece of information can be retrieved, i.e. it includes at least implicitly an identification (e.g. an address) of the computer system on which the information is stored and a reference to the piece of information enabling to retrieve or obtain said piece of information from the identified computer system. A piece of information can be for example a file or a fragment of a file.

For example, the client computer may receive a request to download a website having an URL indicating a location on a (e.g. remote) first server (e.g. for displaying the selected website). The request can be entered manually via a HMI (human machine interface) or it may be generated by a piece of software being executed on the client or on any other computer configured to send the request to the client. Hereinafter, we will use the term 'selected website' as a pars pro toto for any kind of downloadable information being selected (e.g. by the user or by a computer program executed by a computer) for downloading by said request or instruction to download. Examples for downloadable information are accounting data, manufacturing process data, weather data, stock exchange data, business information, probe and/or sensor output data, websites, video and audio data, etc. to name only a few. In particular, it is noted that the option of providing the primary location with the request is only an example. In an alternative example the primary location may always be the same and be stored in the client computer; in this last listed alternative, the request is simply a triggering event to initially load or to update the distributed information.

In the framework of web-technology, this request is often provided to a client computer by a user employing a web-browser by selecting an URL to be displayed, for example by simply selecting a link being displayed by the browser in a corresponding browser window. Alternatively, a user can in most applications directly enter a location (e.g. in the form of an URL) into a corresponding field of the browser. Other human machine interfaces (HMI) may as well be used, relevant is only that distributed information is selected to be downloaded from a first webserver, wherein a webserver herein is a synonym for any data server, except for a proxy server. This selection can be made by a machine, as well, be it another computer or the client computer itself. For example, a download request for loading pieces of distributed information can be generated dynamically in response to parameters in almost any programming language. In another example, a user starts a database query and the requested information is distributed over a number (at least one) of remote data servers Subsequently, the client computer retrieves at least one primary piece of information of the selected distributed information from the first webserver or a proxy server. These primary pieces of information may be provided via a proxy server to the client computer. The proxy server may cache the respective pieces of information or load it from the first webserver and may forward it to the client computer, if no valid copy of the primary pieces of information is cached by the proxy server.

These primary pieces of information include instructions for obtaining secondary pieces of information from other locations than the respective primary piece of information. The secondary pieces of information are thus separately downloadable, mostly in the form of separately downloadable files. These secondary pieces of information can for example be downloaded from the first webserver or from another webserver. The secondary pieces of information itself are not comprised in the primary pieces of information. Mostly, these secondary pieces of information are identified by a file name (mostly including a path) and a server address. Often URLs are used to indicate the locations of the primary and secondary pieces of information, but other standards of indication (file) locations in computer networks can be used as well.

The secondary pieces of information are a part of the selected distributed information and for example required to fully display a website or to complete execution of a program. This means these secondary pieces of information are to be displayed when displaying the selected website or to be executed when running the program, respectively. The selected website would be displayed incomplete if the secondary or lover level pieces of information were missing.

A vivid example for a secondary piece of information is a picture being embedded in a website, wherein the picture itself is not included in the primary piece of information but is downloaded when executing an instruction to download the image from a secondary location. Another vivid example for a secondary piece of information may be a separately stored subroutine or a separately stored library being required for the execution of a computer program. In yet another example, a secondary piece of information may be an array (e.g. a table) or a field of an array of a database. In the latter case the secondary location identifies the location of the data base and the table or field of the table.

These secondary (or lower level, as explained above) pieces of information are to be distinguished from user selectable links in a website. To reuse the initially introduced wording, the primary pieces of information are each identifiable by a separate primary location (e.g. by a primary URL). Each secondary piece of information is identifiable by a different secondary location (e.g. by a secondary URL or any other location identifier, regardless of the standard being applied), wherein the secondary location may indicates where the respective secondary piece of information is (initially) stored; in other words where the secondary piece of information could be retrieved else than on the proxy-server, hence the first or any other webserver and the corresponding path information. The secondary pieces of information are to be loaded (and optionally displayed) when displaying (more general loading) the distributed information comprising the primary and lower level pieces of information. Upper levels of information thus may include at least one instruction to load (and/or display) lower level information. For example, the primary information may comprise an instruction to load and/or display an image in a frame of a website, wherein the image is defined by an URL or portions of a URL. Thus, to display the website with the image, the client has to retrieve the image data from the secondary URL. The secondary URL is in this context an example of a link to a location of secondary piece of information. But each secondary piece of information may comprise at least one link to at least one tertiary piece of information and so on.

In this application a link to a secondary or lower level piece of information may not be mistaken as a link being displayed in the form of meta data to a user (e.g. in the form of URL) on a website that provides the user the opportunity to request displaying the information stored at the displayed URL by selecting it (typically by clinking on the link) to be displayed (or downloaded).

When a user selects a URL, the information being stored at the location defined by the URL is a primary piece of information, that may comprise links to secondary pieces of information. Herein the terms secondary piece of information and piece of secondary information, are used interchangeably. A secondary piece of information is a lower level piece of information relative to the primary piece of information and an upper level information relative to the tertiary pieces of information.

In another subsequent step, the client computer parses the primary information and extracts locations of secondary pieces of information. More generally the client computer parses upper level information and extracts locations of the next lower level pieces of information. Based on the parsing information, the client computer determines a sequence of importance of the secondary (and/or identified lower level) pieces of information. In other words, any secondary (and/or identified lower level) piece of information is assigned a level of importance. Typically, the level of importance can be used to determine a sequence of loading the different secondary pieces of information. Thus, a secondary piece of information having a high level of importance can already be used, e.g. displayed (after being downloaded), while another secondary piece of information is being loaded.

The sequence of importance can be, e.g. a list of the identified pieces of information being sorted according to their respective values of importance. For example, that piece of information having the highest value of importance may be on top of the list being followed by the next important piece of information and so on. Alternatively, for example, that piece of information having the highest value of importance may be at the bottom of the list and be preceded by the next important piece of information and so on. In another example, the sequence in the list is arbitrary, but each piece of information is assigned a number indicating its level of importance. It is not relevant how the sequence of importance is obtained or stored, but relevant is that the more important information can be identified and/or distinguished from less important information on said list.

As indicated above a third or even lower level piece of information can already be downloaded (and optionally be used, e.g. displayed) while another piece of secondary information has not yet been loaded. In this last example, the instruction to load the third or lower level piece of information is comprised in a first secondary piece of information, whereas other information may be comprised in a second secondary piece of information having a lower importance than the first secondary piece of information and lower level pieces of information identified therein by links to further locations. Thus, a piece of information is considered identified once its location is known by the client. More generally, a piece of information of the $(n+1)^{th}$ level can be comprised in a sequence of importance once the piece of information of the $n^{th}$ level comprising the location of the respective piece of information of the $(n+1)^{th}$ level is available to the client.

Thus, highly important information is loaded prior and may optionally be executed and/or displayed prior to loading less important pieces of information. Determining the sequence of importance can be done by any suited algorithm, dozens have been suggested and we will not focus on this aspect here. Only to provide an example, those pieces of information that are to be displayed in a center of a user selected field of view (for example in the visible center of a browser window or a frame) can be assigned a higher importance level and the level of assigned importance is lowered, the farther away from the center of view the pieces of information are to be displayed. Additional or alternative factors for assigning an importance may be used as well, for example advertising information may be assigned higher or lower levels importance than other pieces of information.

Preferably, at the same time or already in advance, the same sequence of importance of the secondary pieces of information is or has been determined by the proxy server. This means that the proxy server preferably provides CPU-time to a routine for determining the sequence of importance, wherein the routine applies the same criteria for assigning a level of importance to the respective pieces of information than the corresponding routine on the client computer. Application of the 'same criteria' can be summarized as executing the same algorithm by the proxy server (or an equivalent algorithm) than the client computer does when determining the sequence of importance. This implies that the proxy server receives the location of the primary information from the client computer, loads the primary information (e.g. from the primary webserver, a proxy cache or another proxy), parses the primary information like the client computer and extracts links to locations of secondary pieces of information. The sequence of importance may as well be determined by the proxy sever subsequently, i.e. after it has been determined by the client computer, but as the primary information is preferably cached by the proxy, the sequence of importance can be determined at least in some cases in advance or in parallel to determining the sequence of importance by the client computer. Thus, like the client computer, the proxy computer parses the primary information and extracts instructions to download secondary pieces of information. At least based on this information the proxy determines the sequence of importance. Depending on the algorithm used by the client computer, the client computer may send information for determining the sequence of importance to the proxy server. For example, if the sequence of importance is determined based on parameters like a selected field of view, the client computer may provide information about these parameters to the proxy server.

For example, the information for determining the sequence of importance may comprise at least one of screen resolution, browser window size, browser window configuration information or the like. Preferably, the client computer provides these or other information for determining the sequence of importance to the proxy server in advance and/or any change of these or other information when they occur (e.g. due to resizing the browser window, scrolling in the window or the like). These any other information for determining the sequence of importance may for example be transmitted in an http User Agent String as a User Agent Profile and/or using other http header fields, e.g. the so-called HTTP Client Hints. The invention is not limited to applications of the http-standards, but http is a very vivid example. Some standards may be proprietary and other, like xml may be open.

At this point it is noted that that there are algorithms for determining a sequence of importance which do not require any browser or screen information. For example, an importance sequencing can be based on the (estimated) geographical distance of the locations for the secondary pieces of information to a predefined geographical location. The level of importance may decrease (or alternatively increase) with increasing distance.

Briefly summarizing, the client computer and the proxy server each generate the same sequence of importance. This means both client computer and the proxy server have the same sequencing information, but this sequencing information has preferably been determined independently from each other. In case the metric for determining the sequence of importance is absolute, the two identical sequences can be determined without any additional submission of parameters. In other cases, the sequence of importance is possibly not an absolute sequence, but instead depends of parameters being stored or elsewise being available to the client computer (like e.g. field of view, user cookies, connection bandwidth, . . . ), the client computer provides these parameters to the proxy server, thereby enabling the proxy server to obtain, based on these parameters the same sequence as the client computer. In both cases, the client computer and the proxy server each generate the same sequence of importance. As will become apparent below, the proxy server uses the sequence of importance (as determined by the proxy server), to send pieces of lower level information in said sequence (there may be exceptions, as explained below in more detail) and the client computer may use the sequence of importance (as determined by the client computer) to identify these lower level pieces of information by the sequence.

A position identifier identifying the position of the respective secondary piece of information in the sequence of importance may be assigned to and be sent together with the respective piece of information. This enables the proxy server to skip sending pieces of information not yet available, while other pieces of information being sequenced after the not yet available information are already available and can hence be sent to so to speak out of the intended order thereby making best use of the available bandwidth. The client computer can receive the sent pieces of information and determine their respective positions in the sequence of importance as determined (and stored) by the client computer based on the position identifier being sent with the respective piece of information. Further, already present pieces of information can be omitted in the sending step, if the proxy server and the client computer both apply the same (or equivalent algorithms) to determine which pieces of information are omitted in the sending step. For example, the step of determining which pieces may be omitted can be based on the information which pieces of information are (still) cached in a cache of the client computer. Or in other words, which pieces are cached by the client's cache and younger than a threshold point in time.

Preferably once at least an initial portion of the sequence of importance has been determined by the client, the proxy sends a first data stream comprising at least those secondary pieces of information to the client computer, which are cached by the proxy server in the sequence of their importance to the client and the client receives the first data stream from the proxy server. For the moment, we will assume that the data stream is obtained (i.e. received) correctly and in sequence by the client. Optional steps for detection and/or correction transmission errors are discussed below.

The client thereby obtains all available secondary pieces of information in a single stream in a defined sequence and is thus enabled to execute and/or display at least a portion of the secondary information as soon as the corresponding first piece of secondary information has been received by the client computer. The secondary pieces of information are provided by the proxy sever to the client computer in the sequence of importance, for example in the sequence they are required for displaying the website in accordance with the underlying algorithm for determining the importance of secondary pieces of information and optionally other lower level pieces of information. In other words, the client computer may identify the received secondary pieces of information by their position in the first data stream. Preferably, each secondary or other lower level piece of information transmitted by the first data stream is assigned a position indicator, wherein the position indicator indicates the intended position of the respective piece of information in the first data stream. The intended position thus corresponds to the position of the respective piece of information in the sequence(s) of importance. The client computer may thus preferably identify at least the secondary or more generally lower level pieces of information by the position indicator being assigned to the respective piece of information in the first data stream. For example, the first data stream may comprise a number of frames, wherein the position indicator being assigned to a piece of information is sent at a defined position in each frame and/or in each first (or $m^{th}$) frame of a piece of information and/or in each last (or $m^{th}$-last frame) of the stream that comprises at least a fraction of the respective piece of information.

In addition or alternatively, each sent frame of a data stream may have a preferably unique and/or preferably consecutive frame number, enabling to identify the content sent by transmitting said frame. Thus, if the client fails to receive a frame or receives an incomplete or otherwise corrupted frame, the client may send a request to the proxy to resend the respective frame. The proxy in response resends said frame to the client, preferably via said first data stream.

At this point it is noted that a subroutine that parses the available pieces of information and sequences the identified locations according to the sequence of being identified is not a sequencing subroutine in the meaning of this application. To define is positively, a sequencing subroutine provides a sequence of importance of identified pieces of information based on at least one variable parameter. A variable parameter is a parameter that is expected to change from client to client. Examples for variable parameters are the geographic location of the client relative to the proxy server, browser window size, screen resolution, browser window configuration information or the like, to name only a few. As well, expected user behavior may be variable parameter.

While sending already cached information, the proxy server may load non cached pieces of information from remote locations into the proxy cache. In many cases loading of the initially non cached pieces of information into the cache can be finished prior to the time when these pieces are to be sequenced in the first data stream according to their level of importance. These pieces of information are thus available (e.g. in the proxy cache) when they are to be sent by the first data stream in accordance with the importance sequence. The sequence of loading the non-cached pieces of information preferably corresponds to the previously obtained sequence of importance.

In case not all secondary (or lower level) pieces of information are available in the proxy cache when they are to be sequenced, the non-available pieces of information may be (preferably initially) omitted in the first data stream and each frame of the data stream may have an object number indicating the position of the information submitted by the respective frame in the sequence of importance. Thus, in case for example the $k^{th}$ (k being a positive integer, k>0) most important secondary piece of information is not available in the proxy cache, the proxy sever sends in the first data stream the first to $(k-1)^{th}$ important pieces of information (which are preferably available, e.g. in the proxy cache), omits the $k^{th}$ important piece of information (which is not available in the proxy cache) and continues with the $(k+1)^{th}$ important piece of information (which is available in the proxy cache) preferably in a single first data stream. Preferably in parallel, the proxy server may download the omitted $k^{th}$ important piece of information and add it into the first data stream, preferably as soon as it is available, e.g. in between of two e.g. secondary pieces or other lower level pieces of information. Alternatively, the omitted secondary piece of information can be added to the end of the first data stream or it can be sent using a separate first data stream. Adding the object number to the sequence frames enables the client receiving the first data stream from the proxy server to identify the pieces of information according to the importance sequence and to store and/or display it correctly. In other words, a mismatch between the calculated sequence of importance and sequence of information in the data stream can be identified by the client and accounted for. A mismatch of information can be avoided.

At this point it should be noted that the description of the invention is based on the assumption that the pieces of information are displayed on a screen, but the pieces of information may as well comprise information to be converted into audible signals. The information may as well be a computer program having separately stored subroutines. Thus, displaying is a pars pro toto and in this sense a synonym for use of information, by providing information via a human machine interface to a user. The invention is not limited to pieces of distributed information being displayable on a screen. The only condition is that it is distributed information as defined above.

To further decrease the time between the initial request by the user and having all pieces of the distributed information e.g. required to display the selected website, the method may further comprise updating a cache storage of the client computer (hereinafter 'client cache'). For example, the client cache may store at least one secondary (as an example for any lower level) piece of information comprised in the first data stream and preferably a time stamp assigned to the at least one secondary piece of information. Further, the method may comprise updating a sent information database on the proxy server by storing an identifier for the secondary (or lower level) pieces of information being sent to the client computer and the assigned time stamp. This enables to omit in subsequent sending steps, those secondary (or other low level) pieces of information in subsequent (and thus second) first data streams which have an identifier having assigned thereto a time stamp being valid, for example because the time stamp is younger than a first threshold date. For example, the time stamp can be a valid until date, i.e. indicate a point in time until which the respective piece of secondary information is considered to be up-to-date and in this sense valid. Alternatively, the time stamp may simply be the point in time when the respective piece of secondary information has been retrieved by the proxy or by the client.

For example, a user may request downloading a particular website at a first point in time, e.g. in the morning and request downloading this particular website at a second later point in time, e.g. in the evening. The method provides all secondary and lower level pieces of information when executed at the first point in time (assuming an initially empty client cache) by the first data stream. At the later second point in time a portion of the pieces of secondary and lower level information may still be valid and stored in the client cache. Thus, when sending the second first data stream which is sent in response to the request at the later point in time the valid stored pieces of second (or lower level) information can be omitted and thereby the amount of data is reduced and shorter transmission times can be obtained.

Determining the validity of a piece of secondary information can be obtained by comparing the time stamp with a threshold date. If the time stamp is younger (optionally including equal) than a threshold date the respective piece of secondary information is valid. If the time stamp is older, the respective piece of secondary information is not valid and thus comprised in the second first data stream. In the most vivid example of a valid piece of information, the assigned time stamp is a valid until date being in the future and the threshold is the present date and time.

The method may further comprise comparing an earlier secondary (or lower level) piece of information for which an identifier has been stored in the sent information data base with a later secondary (or lower level) piece of information being presently available under the same location from which the earlier secondary (or lower level) piece of information has been downloaded. If the comparison provides a difference between the first and second secondary pieces of information, the proxy sever may send to the client computer another data stream comprising the later secondary (or other lower level) piece of information and an assigned time stamp. The another data stream may be appended to the first data stream. It may as well be sent as a separate data stream, e.g. in parallel to the first data stream or at any other point in time. Advantageously, the another data stream may be sent at a point in time when only a fraction of the available bandwidth of the connection between the proxy server and the client computer is used. For example, after all pieces of the distributed information required, e.g. to display a selected website have been sent by the proxy server to the client and preferably no further user request is pending, the proxy server may send another data stream to the client computer. The client computer may receive said another data stream and replace the earlier secondary piece of information in the client cache by the later secondary piece of information together with the associated time stamp in the client cache. The sent information data base may of course be updated accordingly. By this mechanism, the client cache may be updated independently from a user request and more pieces of secondary information with a valid time stamp are available when a user requests downloading information, e.g. a website. Thus, the time between receiving the request by the client computer and having all required pieces of information available on the client computer is reduced. In the above example where the information is displayed, complete displaying can be done earlier. In a preferred example, the second data stream does not comprise the entire second piece of secondary (or lower level) information, but instead only those bits and/or bytes (and their corresponding positions) that differ from the corresponding previously transmitted first piece of secondary (or lower level) information. Thereby, minor changes of a piece of secondary information cause only minimal traffic on the network connection between the client and the proxy.

Preferably, the client comprises a received information database, being essentially identical to the sent information database, at least assuming no transmission losses.

Primary, secondary (or lower level) pieces of information having a time stamp being older than a second threshold date from the cache storage and the corresponding identifier and the associated time stamp can be deleted from the sent information database and from the client cache, wherein both deleting steps start the same given point in time and are thus synchronized. The synchronized deletion enables to reduce cache memory requirements while keeping the optional client cache and the optional sent information database consistent (and as well the optional received information database). The same point in time can be defined, e.g. in a startup procedure or it can be lapse of a given time interval after a certain event. The certain event can be e.g. completion of the last first data stream transmission, establishing an initial connection between the client and the proxy server or any other point in time known to the client and the proxy server. For example, it can be noon, or any other given time of a given day.

The above explained synchronized deleting ensures, that when processing the next request, the client cache and the information about the content of the client cache in the sent information database of the proxy stream server are consistent. For example, the deleting steps can both start when a valid until day lapsed or when the time stamp associated to the respective piece of secondary information is older than a given threshold date.

In a preferred embodiment, the first and/or the another data stream comprise/s a sequence of data frames, wherein an integer positive number j with j>1 of these data frames is sent by the proxy server to the client computer prior to receiving acknowledgment information sent by the client to the proxy, wherein the acknowledgment information is an acknowledgement for receiving data frames previously sent by the proxy server. This can be done e.g. using IP/UDP or another protocol without frame acknowledgment instead of IP/TCP. Thus, in case a frame has not been received or not been correctly received, data transmission is not stopped. Thus, in this preferred example the first data stream is a continuous data stream.

In a further preferred example, the client computer sends acknowledgement information, for example after no further frames of the first data stream have been received after a given amount of time. In a particular preferred example, indirect acknowledgment information may be provided by sending a list of frame numbers or each frame number individually, wherein the frame number(s) indicating those frames that have not been received within an expected time and/or not correctly received. This indirect acknowledgement information is as well referred to as negative acknowledgement and may be sent by the client computer while the proxy server sends further data frames of the first data stream and/or another data stream to the client computer, which is configured to receive these further data frames. The proxy server may receive these indirect acknowledgments and resend those frames that have been identified by the indirect acknowledgment information. Resending of these frames is preferably obtained by adding them to the first data stream, alternatively the resend frames may be sent by any other data stream.

For example, each frame may comprise a hash value obtained by mapping the information of the frame by a hash function. The client may apply the same hash function to the information of the respective frame. The client may compare the such obtained second hash value with the received hash value. If the two hash values match, the corresponding frame is considered to be received correctly. An indirect acknowledgment message is not sent by the client. If the two hash values do not match, the frame has not been correctly received and correct receipt is not acknowledged by sending a corresponding indirect acknowledgement information comprising the frame number of the non-correctly or a non-received frame to the proxy server, which in response may re-transmit the non-acknowledged frames in the first or a second data stream.

For example, each data frame of the respective first or another data stream may comprise position information identifying a unique position of at least a number of data frames in the respective first or another data stream. In the simplest case, the position information is simply a number indicating the position of a frame in the sequence of frames constituting the data stream. The client computer may compare the position information received with a respective data frame with the actual position of the data frame in the sequence of received data frames and preferably determine if the position information comprised in the frame matches with the position in the sequence of received frames or if does not match. Based on the comparison the method may comprise, by the client computer, determining the position information of data frames that have not been received by scanning the received pieces of information for omitted position information, e.g. not received pieces of information are those pieces where consecutively received data frames fail to have consecutive position information. The client may send the position information of the not received data frames (and/or not correctly received data frames) to the proxy server, and in response the proxy server may send a second data stream comprising the previously not-received data frames (and/or not correctly received data frames) to the client computer and/or add the not received data frames to the first data stream.

In a particular preferred embodiment, the proxy server determines a measure of the rate of non-received data frames (which may include the not correctly received data frames) over the sent data frames in the first or another data stream sent by the proxy to the client. Herein non-received data frames can be entirely not received data frames and/or not correctly received data frames and/or the sum of both. If the measure indicates a higher rate than a threshold rate, the single stream server reduces the transmission rate of the second data stream and/or further first data streams and/or further another data streams by an increment. Thereby, the transmission rate is adjusted to a transmission rate that can be maintained without significant loss of information. The number of frames that are retransmitted is minimized.

This step of determining a measure and based on the determined measure decrease the transmission rate may be repeated regularly until the measure of the rate of non-received data frames indicates that the rate of non-received data frames is below a first threshold. The method may as well comprise increasing the transmission rate by a second increment in case the measure indicates that the rate of non-received data frames (which may include the not correctly received data frames) is below a second threshold, wherein the second threshold is below the first threshold. The second increment is preferably smaller than the first increment.

The first and second increments may be adjusted based on an observed change of the rate of non-received data frames for example in response to a prior reduction and/or increase in the transmission rate. These steps improve adapting the transmission rate to an actually usable bandwidth of the network connection.

Adapting the transmission rate and the steps explained in the context of adapting the transmission rate are not limited to the application of adjusting the transmission rate in the particular scenario of a proxy server sending pieces of information to a client according to a sequence of importance, but can be used in any other scenario in which a sender sends frames of a data stream prior to receiving acknowledgment information about the previously sent frame(s), e.g. using IP/UDP protocol. In the context adapting the transmission rate, the sending and receiving pieces of distributed information is only an example application. The transmission rate of any (preferably continuous) data stream may be adjusted to the actually available bandwidth. The only requirement is that the receiver of the stream provides the sender information enabling to calculate a measure of the rate of non-received data frames (which may include not correctly received data frames) over the sent data frames in the data stream sent by the sender to the receiver.

As already implicit, the client and single stream server are connected to a computer network comprising at least one webserver configured to provide information upon request to other computers (e.g. to the client and/or the proxy) being connected to and which thus form part of the computer network.

Other data than website data may be transmitted instead of or in addition to website content, for example distributed stored accounting data, distributed manufacturing data, distributed sensors and/or probe, stock exchange data, business data etc. Herein, we use website data, i.e. information to be displayed on a screen (considered to optionally include audio information) only as a vivid example, but the invention is not limited to this example. The type of content or the benefit of the content is not relevant to the working mechanism of the method and the other embodiments of the invention. All that is required to make advantage of the invention is that distributed information which distributed information is for some reason required by the client computer comprises pieces of information, and wherein said pieces of information are identified by different locations. The distributed information to be downloaded by the client computer is identified by a primary location on a server. At the primary location, a primary piece of information is accessible. The primary piece of information includes instructions for obtaining secondary pieces of information, each being identified by secondary locations, which secondary locations are different from the primary location.

We use herein the term "equivalent algorithm". Two algorithms are equivalent, if they provide the identical results in response to the identical sets of input parameters. Regardless of how these results are obtained or how long it takes to obtain the results. For example, a sequence of steps could be altered without having an impact on the result. An example for such an alteration is replacing an iterative function call by a recursive function call.

DESCRIPTION OF DRAWINGS

In the following the invention will be described by way of example, without limitation of the general inventive concept, on examples of embodiment with reference to the drawings.

In FIG. 1 an embodiment of a communication system is shown. The system comprises a client computer 10 and a proxy server 20. The client computer 10 and the proxy server are connected by a bidirectional network connection 50. Thus, the client 10 can send messages to the proxy 20, which messages can be received by the proxy 20. Similarly, the proxy 20 can send messages to the client 10, which messages can be received by the client 10. A message can be for example a request being sent by the client 10 to the proxy 20. The request can e.g. be a request for sending a data stream. Any internet connection is a typical example for the bidirectional network connection 50. Thus, the message can be e.g. a data stream being sent by the proxy 20 to the client 10.

Figure 1:
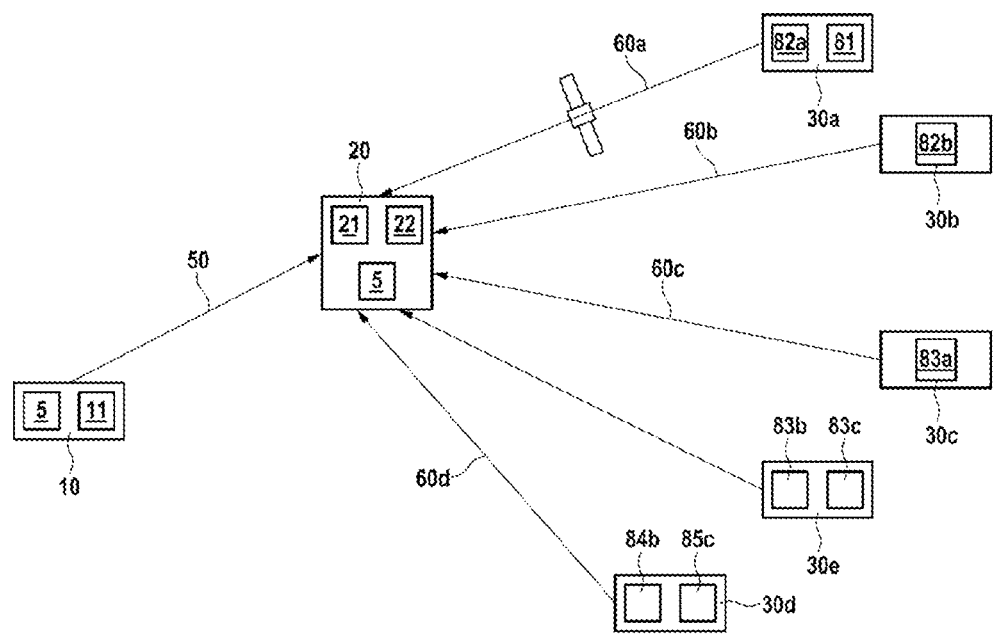
FIG. 1 shows a communication system with a client computer and proxy server.

At least the proxy 20 is connected via at least one bidirectional network connection 60 to at least one web server 30a, 30b, 30c, 30d. Hereinafter, we will simply use reference numeral 30 for any webserver being configured to provide information upon request of the proxy server 20 via the network connection 60 to the proxy server 20.

The bidirectional network connections 50, 60 can be any kind of network connection which may use any transmission mechanism (light, Infrared, radio frequency waves, . . . ) and protocol. Typical examples are an ethernet connection, Wireless Local Area Network connection or radio frequency connections (for example 4G or 5G connections) a combination thereof or any other data transmission means enabling to send and receive information. Only as an example, a satellite-pictogram has been indicated in a connection line to indicate that the bidirectional network connections 50, 60 can for example include satellite connections. Very briefly summarizing the invention is not limited to the use of one of the following technologies: copper or aluminum cables, fibre optic cables, radio frequency transmission, all kinds of Photonics related to quantum optics, optomechanics, electro-optics, optoelectronics and quantum electronics for realizing IP Networks like WLAN, wWLAN, WiFi, 3G/4G/5G/XG, GEO/MEO/LEO Satellite Up- and Downlinks, but any of these technologies may be used and or combined.

Figure 2:
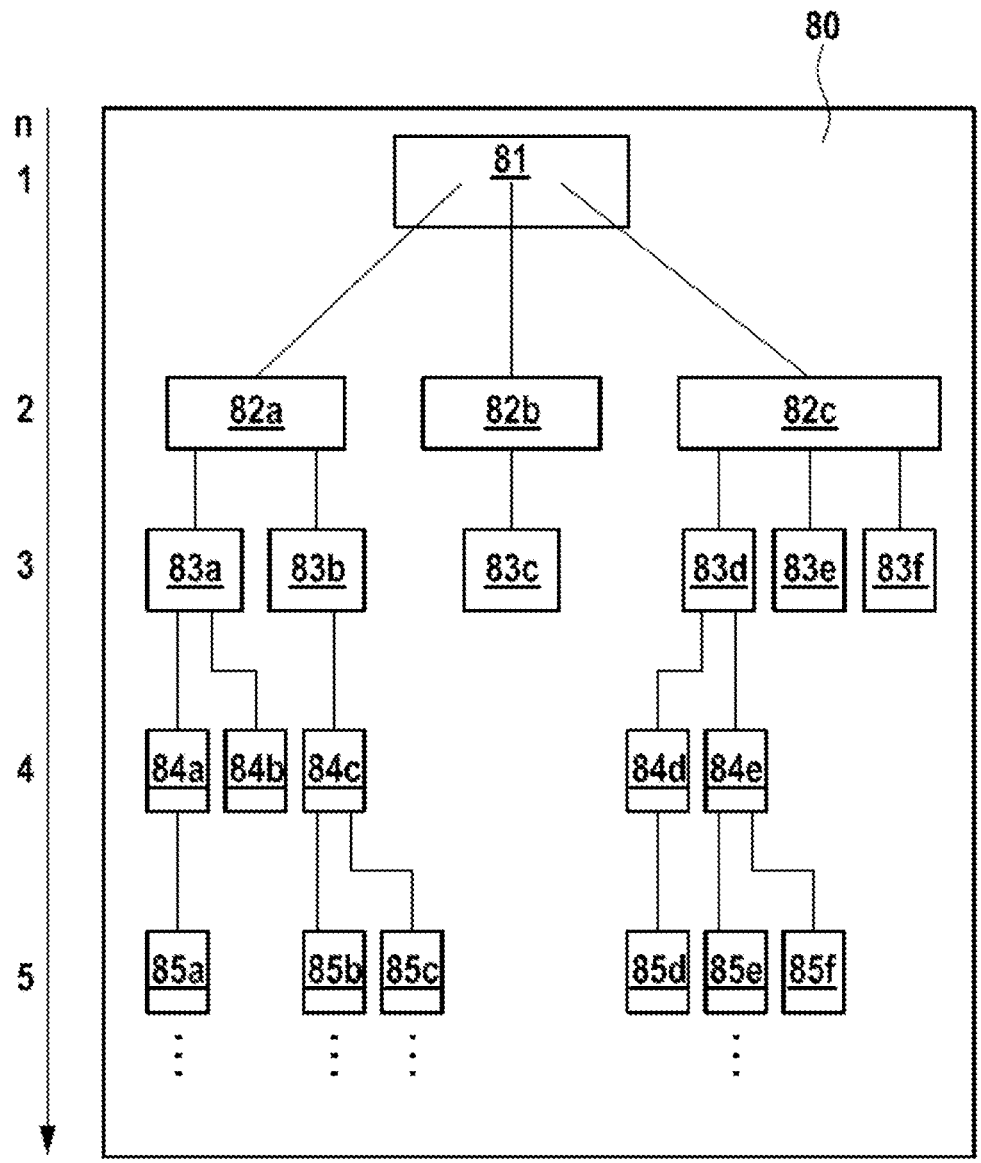
FIG. 2 shows a diagram of a distributed information.

FIG. 2 shows a block diagram of an example of distributed information 80. As explained above the distributed information 80 consists of a number of pieces of information 81, 82a-82c, 83a-83f, 84a-84e, 85a-85f. The number of these pieces of information can be as little as two or greater than 10.000, but the technical effect of speeding the transmission up increases with an increasing number of pieces of information. Today, typical numbers are between 3 and 2000 pieces.

Each of the pieces of information 81, 82a-82c, 83a-83f, 84a-84e, 85a-85f may be stored at a different location. Each of the different locations may be identified e.g., by an URL in the corresponding upper level piece of information, 81, 82a-c, 83a-83f, 84a-84e, respectively. For example, a primary piece of information 81 may be stored on a first webserver 30a (FIG. 1), a first secondary (n=2) piece of information 82a may be stored on the first webserver 30a as well, but as a separate file and thus in a separate location. A second secondary (n=2) piece of information 82b may be stored on the third webserver 30c. A third secondary (n=2) piece of information 82c may be stored on the second webserver 30b and so forth. It is essentially regardless where a particular piece of information 81, 82a-c, 83a-83f, 84a-84e, 85a-85f is stored, provided the location of each piece is comprised in an respective upper level piece of information (as above n denotes the level being indicated at the left hand side of FIG. 2; the term upper (lower) level refers to a number n being smaller (bigger) than the reference to which the comparative "upper" ("lower") refers to). Of course, there does not exist an upper level for the primary piece of information.

For assembling the distributed information, the client may parse a primary piece of information 81. This primary piece of information 81 comprises the locations of a number of secondary (n=2) pieces of information 82. In the depicted example, there are only three pieces of secondary information, but the number "three" is just an example. In general, there is at least one piece of secondary information (similarly the number of tertiary, quaternary and quinary pieces of information is arbitrary and thus 'at least one'). The number of secondary or other lower level pieces of information can vary in wide range, e.g. between 1 and 10.000. There is no conceptual upper limit of this number, only processing speed and bandwidth limit the number pieces of information of a lower level. Parsing the secondary pieces of information provides the locations of the tertiary (n=3) pieces of information and so on. In short, to obtain the location(s) of an $n^{th}$-level piece of information one has to parse the respective upper $(n-1)^{th}$ level piece of information to thereby extract the locations identifying the next lower level pieces of information. The locations can be provided e.g. in the form of an URL.

The distributed information can be e.g. a computer program having different subroutines being stored at different locations. For example, a particular subroutine can form a piece of information. For execution of the computer program the client requires access to all subroutines of the program. In an example, the computer program may be a webpage, for example in html. For displaying the entire webpage, the client computer requires the instructions of any piece of information being included via a link to the respective location.

Figure 3:
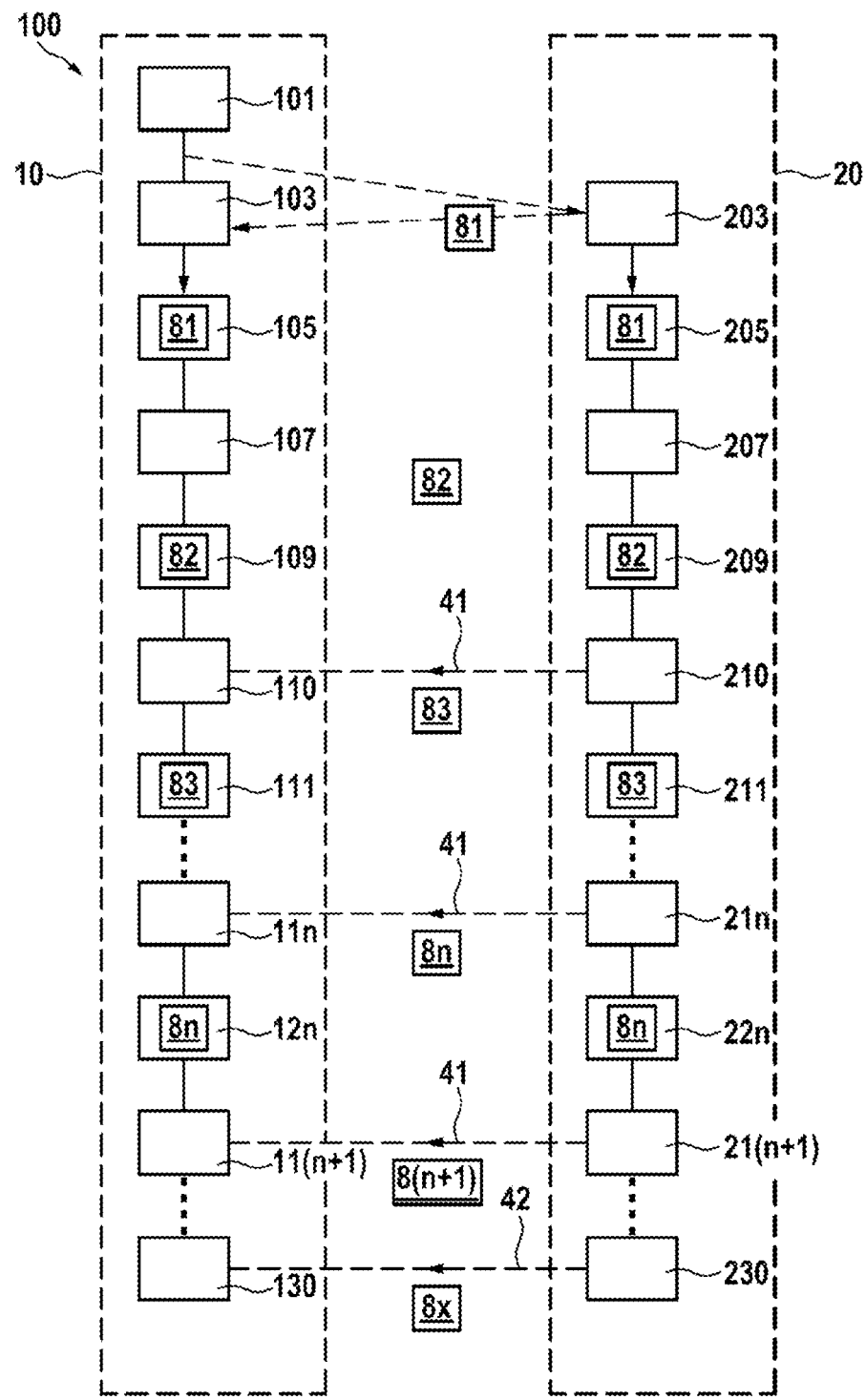
FIG. 3 shows a diagram of method for operating the communication system of FIG. 1 for providing distributed information of FIG. 2 to the client.

The method according to the invention may comprise at least one of the steps being symbolized in FIG. 3 and enables to gather pieces of information 81, 82a-82c, 83a-83f, 84a-84e, 85a-85f forming a distributed information 80:

In a first step 101 a client computer 10 receives an instruction for down-loading a piece of primary information 81 (of a distributed information 80) from a primary location. For example, a user may enter a URL into the address line of an internet browser.

The primary piece of information 81 is obtained, e.g. from a proxy server 20 (and/or a cache and/or the initial primary location itself) and comprises at least one location of a secondary piece of information 82a-82c. In practice, mostly there are multiple secondary pieces of information 82a-82c each having an associated location on a webserver. Herein, we will thus assume that there are multiple secondary pieces of information 82a-c, but a single one may be sufficient. In other words, the primary piece of information 81 includes instructions for obtaining secondary pieces of information 82a-82c, the latter being identified by a location different from the location of the primary piece of information. The locations of the secondary pieces of information are thus included in the primary piece of information. These secondary pieces of information 82a-c are separately downloadable from their respective different locations.

Next, in step 103, the client computer 10 retrieves the primary piece of in-formation 81 of the distributed information 80 from a webserver 30 or from the proxy server 20 or from a client cache 11. At this point it is noted that the client 10 may use the location of a piece of information (e.g.

the primary piece of information) to identify said piece of information on other locations (e.g. in the client cache or on the proxy server).

In Step 105, the client computer 10 parses the primary piece 81 of information and at least extracts locations of secondary pieces of information included in the primary piece of information 81 and determines a sequence of importance at least based on identified secondary pieces of information 82a-c. This step may as well include execution of those parts of the distributed information being already available. For example, if the distributed information is a website, those fragments of the website that can be displayed based on the fragments comprised in the primary piece of information 81 can be displayed.

In step 205, the proxy server 20 as well parses the primary piece of information 81 and at least extracts locations of secondary pieces of information included in the primary piece of information 81 and determines the same sequence of importance at least based on the secondary pieces of information 82a-c as the client computer 10. The sequences of importance are thus each equivalent (including identical) lists of pieces of secondary information. Next, the proxy server 20 sends a first data stream 41 comprising at least one of the secondary pieces of information 82a-c to the client computer 10 in the sequence of importance (step 207). The client 10 in turn receives at least a portion of the first data stream 41 and preferably all pieces of secondary information 82a-82c sent by the proxy server 20 (step 107) in the first data stream 41. The first data stream 41 is preferably sent as a continuous data stream without waiting for acknowledgement messages. For example, the first data stream 41 may be sent using the IP/UDP-protocol.

Step 207 may as well include execution of those parts of the distributed information 80 that became available by receiving the secondary pieces of information 82a-c. In the above example, in which the distributed information is a website, those fragments of the website that can be displayed based on the fragments comprised in at least one secondary piece of information 82a-c can be displayed, prior or in parallel to executing other steps. In case the distributed information is a computer program, the available code fragments can be executed as soon as they are available, i.e. received by the client computer 10.

The method may continue with the steps 109 and 209 both comprising parsing the secondary information 82a-82c for locations of tertiary information and based at least on the instructions included in the secondary pieces of information 82a-c determining a sequence of importance of non yet send but identified secondary and/or tertiary pieces of information 83a-f both, by the client computer 10 and by the proxy server 20 (as indicated by steps 110 and 210). The proxy server 20 can preferably parse the secondary or tertiary pieces of information 82a-82c, 83a-83f already in advance, i.e. at an earlier point in time than the client 10, e.g. in parallel or even prior to start sending the first data stream 41. In any case, the proxy server 20 continues sending pieces of information 82-85 in the sequence of importance via the first data stream 41. It is not necessary that all secondary information 82 has already been transmitted by the proxy server 20 and received by the client 10 prior to sending tertiary or other lower level pieces of information 83, 84, 85. Relevant is only that the algorithm for determining the sequence of importance by the proxy 20 provides the same sequence as the algorithm executed by the client 10. In this sense the two sequencing routines are equivalent and preferably identical.

Further, lower level pieces of information 84a to 85f are identified in the same way, i.e. by parsing corresponding higher-level pieces of information by the client and by the proxy (indicated by steps $11n$, $21n$). The proxy 20 and the client 10 can identify the locations of a lower level piece of information symbolized by $8n$, wherein n denotes the level of the piece of information (e.g. n=4, 5, . . . ; then $8n$=84, 85, . . . ) only after having received the respective upper level piece of information. The proxy 20 preferably has the respective pieces of information in its cache and can thus extract locations of lower level pieces already in advance. The client, however, extracts the locations of the respective lower level piece of information after having received those portions of the first data stream 41 comprising the respective upper level piece of information. Once identified, the pieces of information $8n$ can be transmitted via stream 41 by the proxy 20 to the client 10 (see steps $12n$, $22n$). Thus, n can be increased by 1 and the method continues by repeating the steps $11n$, $21n$, $12n$ $22n$ as $11n+1$, $21n+1$, $12n+1$ and $22n+1$.

Preferably, after each sent piece of information 81, 82a-82c, 83a-83f, 84a-84e, 85a-85f, the proxy server may use an updated sequence of importance for sequencing not yet sent pieces of information in the first data stream 41. The updated sequence of importance may comprise (e.g. in addition) the importance of lower level pieces of information identified by their respective location as comprised in said each sent piece of information. Of course, the step may be omitted after sending a piece of information which does not have an associated lower level piece of information. Similarly, the client 10 may as well determine said updated sequence (or an equivalent) of importance after receipt of said sent piece of information.

Generalizing one may summarize that the client 10 and the proxy 20 both determine identical sequences of identified pieces of information. Subsequently, the identified pieces of information 81, 82a-82c, 83a-83f, 84a-84e, 85a-85f are sent by the proxy 20 to the client as a preferably continuous first data stream 41. The client 10 may receive the stream 41 and obtains the pieces of information 81, 82a-82c, 83a-83f, 84a-84e, 85a-85f according to the sequence of importance.

While the data stream 41 is being sent and received the sequence of the pieces of information 81, 82a-82c, 83a-83f, 84a-84e, 85a-85f is continued until all pieces of information 81, 82a-82c, 83a-83f, 84a-84e, 85a-85f of the distributed information 80 are sequenced and transmitted at least essentially according to the sequence via the first data stream 41. In the best case, all pieces of information 81, 82a-82c, 83a-83f, 84a-84e, 85a-85f are available in the proxy cache 21, thus in this case the first data stream can be sent as a continuous stream.

If one or more pieces of information are identified by the proxy but not available in the proxy cache 21, these can be loaded from the corresponding identified location while other cached and thus available pieces of information are transmitted via the first data stream 41 to the client 10. For example, if a lower level (n>1) piece of information is not yet available in the proxy cache 21 for being sent via stream 41 to the client 10 although it is sequenced to be sent next, sending these pieces can be shifted to a later point in time. Thus, these non-available pieces are not sent according to their position in the sequence, thereby enabling to send available pieces via the preferably continuous first data stream 41, instead. At least the non-shifted pieces of information are preferably enumerated according to their position in the sequence, e.g. by a number in e.g. in a header of a frame. In other words, when sending the non-shifted and/or shifted pieces of information, each piece of information is preferably tagged with a position identifier which position identifier indicates the position of the respective piece of information in the sequence of importance. For example, the first data stream 41 may consist of a sequence of frames. The position identifier being tagging each piece of information enables the client to identify any received piece of information by its position in the sequence of importance (e.g. by a reverse look-up). The enumeration can be transmitted for example in a header portion preceding each piece of information in the first data stream 41. A number of empty frames (or at least a frame encoding the information that a piece of information is not yet available) can be sent instead of the not yet available piece(s) of information, thereby maintaining synchronization of sent data and the expectation of the client about the pieces of information being sent according to the sequence. The empty frames can be identified by the client and optionally a later transmission can be requested by the client 10 from the proxy 20. The proxy may as well send the initially omitted pieces of information in the first or a second data stream, once the respective pieces became available. Again, a number (or any other kind of position identifier) may be provided, e.g. in the header of the respective frame(s) wherein the number corresponds to the position in the initially determined sequence. This is one possibility to enable the client to identify the received data as the initially omitted pieced of information.

As well, the initially omitted pieces of information $8x$ (wherein x is an integer and x>1) can be submitted as a subsequent second data stream 42 and may have the same initiating role as the piece of primary information in the example above, sending and receiving these initially omitted pieces of information in the second data stream 42 is indicated as steps 230 and 130 respectively.

More generally speaking, each upper level piece of information has an initiating role for sending those lower level pieces of information in the first or optionally in the second data stream 41, 42.

As depicted in FIG. 1, the client may have a client cache 11 and be configured to store pieces of information received via the data stream 41 from the proxy server 20 in the client cache 11. The proxy server may comprise a sent information database 22. The sent information database keeps track of the information being sent to the client and thus being present in the client cache 11. Thus, a retransmission of pieces of data can be avoided, by simply omitting the pieces of information that are in the client cache 11 in the sequence of importance. Optionally, a time stamp is assigned to at least one of the pieces of information stored in the client cache 11 and the same time stamp may be stored in the sent information database. The assigned time stamp enables to determine a time after which the cached information is no longer considered present and accordingly the corresponding piece of information would be included in the sequence of importance again, if it is a part of distributed information to be made available on the client 10.

In FIG. 3, Step 205 is indicated to be performed after step 203, but this sequence is only an example. The sequence of importance can be generated at any time once the proxy server has obtained the primary piece of information and prior to sending the first secondary piece of information. This point in time can be even prior to receiving the information about the primary location from the client, as a proxy typically caches websites or other information that is expected to be requested, but preferably not actually requested when being cached. Similarly steps 209, 211, or more generally $21n$ can be performed at any time after loading the respective piece of information by the proxy e.g.

from the location of said respective piece of information and prior to sending the corresponding next lower ('n+1') level pieces of information.

Further, it has been explained with respect to steps 103 and 107 that any piece of information may be used as intended (executed, displayed, . . . ) once it has become available to the client computer 10. This may take place in parallel with receiving further pieces of information 8*n* via a data stream, e.g. the first data stream 41.

LIST OF REFERENCE NUMERALS 5 sequence of importance (list)
10 client computer
11 Client cache
20 proxy computer
21 proxy cache
22 sent information database
30*a* to 30*d* web server
41 first data stream
42 second data stream
50 bidirectional network connections/data links
60*a* to 60*d* bidirectional network connections/data links
81 primary pieces of information
82*a* to 82*c* secondary piece of information
83*a* to 83*f* tertiary pieces of information
84*a* to 84*e* quaternary pieces of information
85*a* to 85*f* quinary pieces of information
100 a system

The invention claimed is:

1. A method for obtaining distributed information by a client computer of a computer network, wherein the distributed information comprises pieces of information and wherein which pieces of information are identified by different locations, the method comprising:
  (i) by a client computer: receiving a command for downloading distributed information being identified by a primary location on a server;
  (ii) by the client computer: sending information about the primary location to a proxy server;
  (iii) by the proxy server: Receiving the information about the primary location from the client computer;
  (iv) by the client computer: Retrieving at least one primary piece of information of the distributed information being identified by the primary location from the primary location and/or from a proxy server and/or a client cache, wherein the primary piece of information includes instructions for obtaining separately downloadable secondary pieces of information, wherein each secondary piece of information is identified in the primary piece of information by a secondary location, wherein the secondary location is different from the primary location, and wherein the secondary pieces of information are separately downloadable and part of said distributed information;
  (v) by the client computer: Determining a sequence of importance of the secondary pieces of information using an algorithm;
  (vi) by the proxy server: Determining the sequence of importance of the secondary pieces of information using the same algorithm as the client computer in feature (v) or algorithm equivalent to algorithm in feature (v),
  (vii) by the proxy server: Sending a first data stream comprising at least a portion of the secondary pieces of information to the client computer wherein the secondary pieces of information are sequenced according to their position in the sequence of importance as determined by the proxy server and/or wherein secondary pieces of information are sent with a position indicator identifying the position of the respective secondary piece of information in the sequence of importance as determined by the proxy server, and
  (viii) by the client computer: receiving the first data stream and using the sequence of importance as determined by the client computer as a look-up table to identify at least one piece of information received via the first data stream by its position in the first data stream and/or by the position indicator.

2. The method of claim 1, characterized in that it further comprises, by the proxy server, sending the primary information and at least one of the secondary pieces of information in the first data stream, and/or the first data stream is a continuous stream.

3. The method of claim 1, characterized in that it further comprises, in step (vii), omitting a number of secondary pieces of information in the first data stream and enumerating the non-omitted secondary pieces of information according to the determined sequence.

4. The method of claim 3, characterized in that, after having sent a secondary piece of information, the proxy server replaces the sequence of importance by an updated sequence of importance, wherein the updated sequence of importance comprises an importance of at least one first tertiary piece of information and the non-sent secondary pieces of information, wherein each of the at least one first tertiary piece of information is identified in said sent secondary piece of information by a first tertiary location.

5. The method of claim 4, characterized in that it further comprises:
  by the client computer and after the client computer received said secondary piece of information: extracting from said received secondary piece of information at least one location of a tertiary piece of information and determining an updated sequence of importance at least of the not yet received pieces of secondary information and of the at least one piece first tertiary piece of information.

6. The method of claim 4, characterized in that the method steps as defined in claim 4 are performed while the client computer continues to receive the first data stream.

7. The method of claim 1, characterized in that it further comprises:
  updating a cache storage on the client computer, wherein the cache storage comprises at least one of the secondary pieces of information and a time stamp assigned to the at least one of the secondary pieces of information being received as a portion of the first data stream; and
  updating a sent information database on the proxy server by storing an identifier for the secondary pieces of information being sent to the client computer and the assigned time stamp;
  by the client computer: sending a second information about a second primary location to the proxy server;
  by the proxy server: Receiving the second information about the second primary location from the client computer;
  by the client computer: Retrieving at least one second primary piece of information of the distributed information being identified by the primary location from the primary location and/or from a proxy server and/or a client cache, wherein the second primary piece of information includes instructions for obtaining secondary pieces of information each being identified by secondary locations, which secondary locations are different from the second primary location;

by the client computer: Determining a second sequence of importance of the second secondary pieces of information using an algorithm;

by the proxy server: Determining the second sequence of importance of the secondary pieces of information, by the proxy server: Sending a second first data stream comprising at least a portion of the second secondary pieces of information to the client computer wherein secondary pieces of information are sequenced according to their position in the sequence of importance as determined by the proxy server and/or wherein secondary pieces of information are sent with a position identifier identifying the position of the respective secondary piece of information in the sequence of importance as determined by the proxy server, wherein second secondary pieces of information in the second first data stream which have an identifier having assigned thereto a time stamp being younger than a first threshold date are omitted when sequencing the second first data stream, by the client computer: receiving the second first data stream and using the sequence of importance as determined by the client computer as a look-up table to identify at least one piece of information received via the first data stream by its position in the first data stream and/or by the position indicator, wherein the second secondary pieces of information being stored in the client's cache storage which have an identifier having assigned thereto a time stamp being younger than a first threshold date are considered to be omitted in the secondary pieces of information being received.

8. The method of claim 3, characterized in that it further comprises, comparing a first piece of information for which an identifier has been stored in the sent information data base with a another piece of information being presently available under the location that identified the first piece of information, and if the comparison provides a difference between the two secondary pieces of information, sending to the client computer another data stream comprising the another piece of information and an assigned time stamp.

9. The method of claim 3, characterized in that it further comprises deleting secondary pieces of information having a time stamp being older than a second threshold date from cache storage and deleting the corresponding identifier and the associated time stamp from the sent information database, wherein both deleting steps start at the same given point in time.

10. The method of claim 1, characterized in that the first and/or the another data stream comprises a sequence of data frames, wherein a number of these data frames is sent by the proxy server to the client computer prior to receiving an acknowledgment for previously sent data frames by the proxy server.

11. The method of claim 10, characterized in that:
each data frame of the respective first or another data stream comprises position information identifying a unique position of the data frame in the respective first data stream or another data stream, and in that the client computer is configured:
  to compare the position information received with the respective data frame with the actual position of the data frame in the sequence of received data frames,
  based on the comparison, to determine the position information of data frames that have not been received as those position information, wherein consecutively received data frames fail to have consecutive position information, and
  to send the position information of the not received data frames from the client computer to the proxy server, and
further comprising: by the proxy server, sending a data stream comprising the previously not received data frames to the client computer.

12. The method of claim 11, characterized in that the proxy server is configured to determine a measure of the rate of the not received data frames over the sent data frames in the first or another data stream and—if this measure indicates a rate higher than a threshold rate—to reduce the transmission rate of the second data stream and/or further first data streams and/or further other data streams.

13. The method of claim 1, characterized in that said retrieving the at least one primary piece of information comprises:
  a. sending a URL identifying a primary piece of information of the at least one primary piece of information on the first webserver to the proxy server by the client,
  b. sending the primary piece of information by the proxy server to the client computer, and
  c. receiving the primary piece of information sent by the proxy server by the client.

14. The method of claim 13, characterized in that the proxy server is configured to identify those secondary pieces of information not being cached by the proxy server and, while sending the primary piece of information, to send a download request for those secondary pieces of information to a webserver having these identified secondary pieces of information.

15. A non-transitory computer readable medium, characterized in that it comprises computer readable instructions for a client computer to perform the method steps of:
  receiving a command for downloading distributed information being identified by a primary location on a server;
  sending information about the primary location to a proxy server;
  retrieving at least one primary piece of information of the distributed information being identified by the primary location from the primary location and/or from a proxy server and/or a client cache, wherein the primary piece of information includes instructions for obtaining secondary pieces of information each being identified by secondary locations, wherein the secondary locations are different from the primary location;
  determining a sequence of importance of the secondary pieces of information using an algorithm;
  receiving a first data stream and using the sequence of importance as determined by the client computer as a look-up table to identify at least one piece of information received via the first data stream by its position in the first data stream and/or by a position indicator.

16. The non-transitory computer readable medium of claim 15, characterized in that it further comprises at least computer readable instructions for performing the following:
  by the client computer and after a client computer received said secondary pieces of information:
  extracting from said received secondary piece of information at least one location of a tertiary piece of information and determining an updated sequence of importance at least of not yet received pieces of secondary information and of the at least one piece first tertiary piece of information.

17. A non-transitory computer readable medium characterized in that it comprises computer readable instructions for performing the following:

(i) by a client computer: receiving a command for downloading distributed information being identified by a primary location on a server;

(ii) by the client computer: sending information about the primary location to a proxy server;

(iii) by the proxy server: Receiving the information about the primary location from the client computer;

(iv) by the client computer: Retrieving at least one primary piece of information of the distributed information being identified by the primary location from the primary location and/or from a proxy server and/or a client cache, wherein the primary piece of information includes instructions for obtaining separately downloadable secondary pieces of information, wherein each secondary piece of information is identified in the primary piece of information by a secondary location, wherein the secondary location is different from the primary location, and wherein the secondary pieces of information are separately downloadable and part of said distributed information;

(v) by the client computer: Determining a sequence of importance of the secondary pieces of information using an algorithm;

(vi) by the proxy server: Determining the sequence of importance of the secondary pieces of information using the same algorithm as the client computer in feature (v) or algorithm equivalent to algorithm in feature (v), (vii) by the proxy server: Sending a first data stream comprising at least a portion of the secondary pieces of information to the client computer wherein the secondary pieces of information are sequenced according to their position in the sequence of importance as determined by the proxy server and/or wherein secondary pieces of information are sent with a position indicator identifying the position of the respective secondary piece of information in the sequence of importance as determined by the proxy server, and (vii) by the client computer: receiving the first data stream and using the sequence of importance as determined by the client computer as a look-up table to identify at least one piece of information received via the first data stream by its position in the first data stream and/or by the position indicator.

* * * * *